US012151970B2

(12) United States Patent
Cid-Aguilar et al.

(10) Patent No.: US 12,151,970 B2
(45) Date of Patent: Nov. 26, 2024

(54) SOLAR CONTROL THIN GREEN GLASS COMPOSITION

(71) Applicant: VIDRIO PLANO DE MEXICO, S.A. DE C.V., Nuevo León (MX)

(72) Inventors: José Guadalupe Cid-Aguilar, Nuevo León (MX); David R. Haskins, Gibsonia, PA (US); Michael Ulizio, Pittsburgh, PA (US); DeWitt W. Lampman, Allison Park, PA (US)

(73) Assignee: Vidrio Plano de México, S.A. de C.V., Nuevo León (MX)

( * ) Notice: Subject to any disclaimer, the term of this patent is extended or adjusted under 35 U.S.C. 154(b) by 0 days.

(21) Appl. No.: 16/212,338

(22) Filed: Dec. 6, 2018

(65) Prior Publication Data
US 2020/0180997 A1 Jun. 11, 2020

(51) Int. Cl.
*C03C 3/087* (2006.01)
*B32B 7/023* (2019.01)
(Continued)

(52) U.S. Cl.
CPC .............. *C03C 3/087* (2013.01); *B32B 7/023* (2019.01); *B32B 17/10036* (2013.01);
(Continued)

(58) Field of Classification Search
CPC .. C03C 3/087; C03C 4/00; C03C 4/02; C03C 4/18; C03C 4/08; B32B 17/10; B32B 7/023
(Continued)

(56) References Cited

U.S. PATENT DOCUMENTS

| 4,339,541 A | 7/1982 | Dela Ruye |
| 4,792,536 A | 12/1988 | Pecoraro et al. |

(Continued)

FOREIGN PATENT DOCUMENTS

| CA | 2029987 C | 1/2002 |
| CL | 200002386 | 9/2000 |

(Continued)

OTHER PUBLICATIONS

ASTM E308 90, "Standard Test Method for Computing the Colors of Objects by Using the CIE System", pp. 1-27.
(Continued)

*Primary Examiner* — Tahseen Khan
(74) *Attorney, Agent, or Firm* — The Webb Law Firm (57) ABSTRACT

The present invention refers to a glass composition and a method for the commercial production of a solar control thin green glass mainly for use in the automotive industry such as symmetric-hybrid windshields or asymmetric-hybrid windshields, sidelights and rear windows, which includes a basic composition of soda-lime-silica glass, and consists essentially, in weight percentage: from 1.30 to 2.50% of total iron expressed as $Fe_2O_3$; from 15 to 40% of $Fe^{2+}$ (Ferrous) and from 0.15 to 0.65% of FeO, expressed as $Fe_2O_3$; from about 0.05 to about 0.30% of $SO_3$; from about 0.02 to about 1.0% of $TiO_2$; from about 0.0002 to about 0.03% of $Cr_2O_3$; and from about 0.0002 to about 0.015% of CuO. The solar control thin green glass having an illuminant "A" light transmission ($T_{LA}$) greater than 70%, a direct solar transmittance ($T_{DS}$) of less than 51%, a total UV light transmittance ($T_{UV}$) of less than 40% and a total solar transmittance ($T_{TS}$) of less than 63%; a dominant wavelength ($\lambda$) from 490 nm to 600; and excitation purity less than 7, for thickness from about 0.7 to 3.0 mm.

20 Claims, 4 Drawing Sheets

(51) Int. Cl.
  *B32B 17/10* (2006.01)
  *C03C 4/00* (2006.01)
  *C03C 4/02* (2006.01)
  *C03C 4/08* (2006.01)
  *C03C 4/18* (2006.01)

(52) U.S. Cl.
  CPC .. *B32B 17/10045* (2013.01); *B32B 17/10082* (2013.01); *B32B 17/10137* (2013.01); *B32B 17/10761* (2013.01); *C03C 4/0085* (2013.01); *C03C 4/02* (2013.01); *C03C 4/085* (2013.01); *C03C 4/18* (2013.01); *B32B 2307/4026* (2013.01); *B32B 2307/412* (2013.01); *C03C 2204/00* (2013.01)

(58) Field of Classification Search
  USPC ........................................................ 428/220
  See application file for complete search history.

(56) References Cited

U.S. PATENT DOCUMENTS

| | | |
|---|---|---|
| 5,077,133 A | 12/1991 | Cheng |
| 5,112,778 A | 5/1992 | Cheng et al. |
| 5,700,579 A | 12/1997 | Jeanvoine et al. |
| 5,776,845 A | 7/1998 | Boulos et al. |
| 5,830,812 A | 11/1998 | Shelestak et al. |
| 6,030,911 A | 2/2000 | Scheffler-Hudlet et al. |
| 6,350,712 B1 | 2/2002 | Cabrera-Ilanos |
| 6,413,893 B1 | 7/2002 | Shelestak et al. |
| 6,589,897 B1 | 7/2003 | Foguenne |
| 6,753,280 B2 | 6/2004 | Seto et al. |
| 7,632,767 B2 | 12/2009 | Nagashima et al. |
| 7,682,999 B2 | 3/2010 | Teyssedre |
| 9,573,841 B1 | 2/2017 | Cid-Aguilar et al. |
| 9,616,641 B2 | 4/2017 | Cleary et al. |
| 10,011,521 B2 | 7/2018 | Nagai et al. |
| 2003/0091836 A1 | 5/2003 | Bonis et al. |
| 2004/0071982 A1* | 4/2004 | Seto .................. C03C 3/087 428/426 |
| 2007/0154724 A1 | 7/2007 | Muromachi et al. |
| 2008/0026211 A1 | 1/2008 | Nagashima et al. |
| 2011/0297900 A1* | 12/2011 | Cid-Aguilar ........... C03C 3/087 252/588 |
| 2012/0058879 A1* | 3/2012 | Kim ..................... C03C 4/02 501/64 |
| 2012/0328843 A1 | 12/2012 | Cleary et al. |
| 2015/0158275 A1 | 6/2015 | D'Errico et al. |
| 2015/0307389 A1 | 10/2015 | He et al. |
| 2016/0082705 A1 | 3/2016 | Fisher et al. |

FOREIGN PATENT DOCUMENTS

| | | | |
|---|---|---|---|
| CN | 1376137 A | 10/2002 | |
| CN | 105408109 A | 3/2016 | |
| EP | 0864545 A1 | 9/1998 | |
| GB | 2403731 A * | 1/2005 | ....... B32B 17/10036 |
| JP | 2011116571 A | 6/2011 | |
| WO | 2005063643 A1 | 7/2005 | |
| WO | 2011152698 A2 | 12/2011 | |
| WO | 2015031594 A2 | 3/2015 | |
| WO | 2017154510 A1 | 9/2017 | |

OTHER PUBLICATIONS

Bamford, "Colour Generation and Control in Glass", Glass Science and Technology 2, 1977, pp. 47-50.

Beals et al., "Effects of Titanium Dioxide in Glass", The Glass Industry, 1963, pp. 495-501, 530-531, 625-629, 647, 679- 650, 679-683, and 694.

Brewster et al., "The Colour of Iron-Containing Glasses of Varying Composition", Journal of the Society of Glass Technology, pp. 332-407.

Cleary et al., "Reliability Evaluation of Thin, Lightweight Laminates for Windshield Applications", SAE International J. Passeng. Cars—Mech. Syst., Apr. 2016, pp. 353-359, vol. 9, Issue 1.

Densem et al., "The Equilibrium Between Ferrous and Ferric Oxides in Glasses", Journal of the Society of Glass Technology, pp. 372-389.

Fyles, "Modern Automotive Glasses", Glass Technology, Feb. 1996, pp. 2-6, vol. 37, No. 1.

Hostetter et al., "Note on the Dissociation of Ferric Oxide Dissolved in Glass and its Relation to the Color of Iron-Bearing Glasses", pp. 927-938.

Leonhard et al., "Novel Lightweight Laminate Concept with Ultrathin Chemically Strengthened Glass for Automotive Windshields", SAE International J. Passeng. Cars—Mech. Syst., May 2015, pp. 95-103, vol. 8, Issue 1.

Mallick, "Advanced Materials in Automotive Applications: An Overview", Woodhead Publishing Limited, 2012, 5 pages.

Weyl, "The Colours Produced by Copper", Coloured Glasses, Chapter XI., pp. 154-167.

Weyl, "The Colors Produced by Chromium", Coloured Glasses, Chapter IX., pp. 132-143 and 60-61.

* cited by examiner

SOLAR CONTROL THIN GREEN GLASS COMPOSITION

BACKGROUND OF THE INVENTION

A. Field of the Invention

This invention describes a solar control thin green glass composition, mainly for its use in the automotive industry for symmetric-hybrid windshields or asymmetric-hybrid windshields, sidelights and rear windows, applied as laminated or tempered glass, which has a soda-lime-silica composition, with a colorant portion in weight percentage of: $Fe_2O_3$ from 1.30 to 2.5%, ferrous (reduction) from 15 to 40%, FeO from 0.15 to 0.65% expressed as $Fe_2O_3$, $SO_3$ from about 0.05 to about 0.30%, $TiO_2$ from about 0.02 to about 1.0%, $Cr_2O_3$ from about 0.0002 to about 0.03% and CuO from about 0.0002 to about 0.015%.

B. Description of the Related Art

Several patents have been developed for producing green glasses for automotive purposes, having a light transmission greater than 70% that meets with the requirements of the US Federal Motor Vehicle Safety Standard. This percentage of light transmission is required to provide the driver a good visibility of his surroundings, thus complying with the norms of automotive safety. For the construction industry this restriction does not apply and lower values can be obtained as well as thicknesses from about 1.6 to 12 mm.

Similarly, it is highly desirable that the glass possesses the necessary absorption properties to absorb damaging infrared (IR) and ultraviolet (UV) solar light, as well as to control the accumulation of heat in the interior of vehicles, which will result in a reduction in power consumption needed for the automotive air conditioning equipment and for the vehicles themselves and to protect the interior of the vehicle from the degradation caused by ultraviolet radiation.

The solar control refers to the capacity to modify the amount of solar radiation transmitted or reflected, in the spectral ranges of the near ultraviolet (UV; 300-380 nm), visible (VIS; 380-780 nm) and infrared (IR; 780-2500 nm). The transmitting characteristics of the glass of different wavelengths can be controlled by adding several absorbing coloring agents to the basic composition of the glass.

The glasses disclosed in almost all the patents referring to a type of green glass for automotive purposes, are based on three basic components: iron oxide, titanium oxide and chromium oxide.

Consequently, for vehicle applications, it has been desirable to use colorants to produce a glass that is able to filter a large portion of the damaging ultraviolet radiation from the sun, lower than 39% (measured in the wavelength of 300-400 nm and air mass 2 or less than 35% in the same wavelength range with air mass equals 1.5), but that permits the largest possible visible amount (of the luminous radiation) to 70% or more.

Iron is presented in the glass (silica-sodium-calcium) in two compounds that depend on the oxidation state of iron: if the iron is found as $Fe^{2+}$, the compound formed is ferrous oxide (FeO). If iron is found as $Fe^{3+}$, ferric oxide ($Fe_2O_3$) would be found. Each ion confers different properties; ferrous ion has a broad and strong absorption band centered at 1050 nm, which translates into a decrease in infrared radiation. In addition, this band extends to the visible region decreasing the transmission of light and imparting a bluish coloration on the glass. On the other hand, the ferric ion has a strong absorption band located in the ultraviolet region, which obviously prevents its transmission through the glass and, in addition, it has two weak bands in the visible region located between 420 and 440 nm, which cause a slight decrease in light transmission and a yellowish coloration in the glass.

Generally, the iron in the glass and the amount of ferrous oxide are expressed in the $Fe_2O_3$ form. It is common in the industry to express the amount of ferrous or ferric oxide as the percentage of total iron. The balance between ferrous and ferric oxide has a direct effect on the characteristics of the color and transmittance of the glass.

$$\% \text{ Redox (\% Ferrous)} = \frac{\text{FeO(expressed as } Fe_2O_3) \times 100}{\text{Total } Fe_2O_3}$$

This means that the greater the amount of ferric ion ($Fe^{3+}$) present in the glass, the greater the absorption of ultraviolet radiation and the transmission of light will increase; as well as the yellowish hue; but, if the content of the ferrous ion ($Fe^{2+}$) increases as a result of the chemical reduction of $Fe_2O_3$, the absorption of the infrared radiation will increase, but the ultraviolet radiation will decrease as well as the light transmission.

[Yellow+Blue=Green]

The variation of the concentration of FeO in relation to $Fe_2O_3$, gives rise to a change of color in the glass. The displacement of the color can be modified from yellow through green, blue until reaching amber. The color changes in the following way (according to experimental results):

Yellow—Low Ferrous (12%)—High light transmission (High ferric ion)
Yellow—Green (16%)
Green—Yellowish (20%)
Green (25% typical green glass value)
Bluish Green (29%)
Greenish Blue (35%)
Blue (50%)
Olive Green (60%)
Champagne (65%)
Amber—High ferrous (75%)—Low light transmission (low ferric ion)

In order to control the balance between ferrous oxide and ferric oxide necessary to achieve a solar control glass, it is necessary to establish the batch conditions and melting atmosphere; for the first case, the concentration of reducing agents such as carbon and oxidizing agents, such as sodium sulfate and sodium nitrate is adjusted. Regarding melting conditions, it is necessary to adjust the atmosphere with varying oxygen content; depending on the thermal performance and the desired glass hue.

Titanium oxide ($TiO_2$) in silica-sodium-calcium glasses. It is well known that titanium oxide also acts as a colorant and when used in combination with $Fe_2O_3$, it is possible to obtain a further reduction of ultraviolet radiation transmission to a point where the desired visible transmission is achieved. The most stable form of titanium in glasses is tetravalent ($Ti^{4+}$). The trivalent form could confer coloration; however, this effect is not observed in the silica-sodium-calcium glass. In the document M. D. Beals in the paper, "Effects of Titanium Dioxide in Glass", The glass industry, September 1963, pp 495-531, describes the interest that has been shown for titanium dioxide as a constituent of glasses. The effects produced by the use of titanium dioxide included the comments that $TiO_2$ greatly increases the refractive index, increases the absorption of light in the ultraviolet region, and that it lowers the viscosity and surface tension. From the data on the use of titanium dioxide in enamels, they noted that $TiO_2$ increases the chemical durability and acts as a flux. In general, clear glasses containing titanium dioxide may be found in all of the common glass-forming systems (borates, silicates, and phosphates). The various regions of glass formation for systems containing titanium dioxide are not grouped in any one place, since the organization of the discussion is based more on the properties than use of glasses containing titanium dioxide than on their constitution alone.

There is literature on colored glass compositions with infrared and ultraviolet radiation absorbing characteristics. W. A. Weyl in the book Coloured Glasses, Society of Glass Technology, reprinted 1992, describes diverse theories of colour in glasses related to the current views of the structure and constitution of glass. The use of chromium and its compounds for coloring glasses is described in this book. In the glass industry the chromium is added to the raw materials to obtain a color emerald green, which is typical of $Cr^{3+}$. The chromium can be present as $Cr^{6+}$ or $CrO_4^{2-}$ to obtain a lightly yellow color and as $Cr^{2+}$ through which the emerald green is obtained.

C. R. Bamford, in the book Colour Generation and Control in Glass, Glass Science and Technology, Elsevier Science Publishing Co., Amsterdam, 1977; describes the principles, the methods, and the applications regarding the coloration of glass. In this book the author considers that three elements govern the color of the light transmitted by a glass, namely: the color of the incident light; the interaction of the glass with that light; and the interaction of the transmitted light with the eye of the observer. The procedures require the spectral transmission data of the glass at the relevant glass thickness and the relevant angle of viewing.

K. M. Fyles, in the paper Modern Automotive Glasses, Glass Technology, vol. 37, February 1996, pp 2-6, considers that x iron is the most important colorant in modern automotive glasses since it is the only low cost component available which absorbs harmful ultraviolet radiation (ferric iron) and also absorbs a large proportion of the infrared (ferrous iron).

Gordon F. Brewster, et al., in the paper "The color of iron containing glasses of varying composition", Journal of the Society of Glass Technology, New York, USA, April 1950, pp 332-406, is related to the color changes caused by systematic composition variations in iron-containing silicate and silica-free glasses evaluated in terms of visual colour, spectral transmission and chromaticity.

Other papers also describe the importance of the equilibrium between ferrous and ferric oxides in glasses such as the one written by N. E. Densem; "The equilibrium between ferrous and ferric oxides in glasses"; Journal of the Society of Glass Technology, Glasgow, England, May 1937, pp. 374-389; J. C. Hostetter and H. S. Roberts, "Note on the dissociation of Ferric Oxide dissolved in glass and its relation to the color of iron-bearing glasses"; J. of the American Ceramic Society, USA, September, 1921, pp. 927-938.

Regarding patents that have been developed for obtaining colored glass using a standard soda-lime glass base composition, different metallic elements have been used to confer the desired characteristics to the final product, including a $T_{LA}>70\%$, to be used in the automotive industries.

The U.S. Pat. No. 4,792,536 by Pecoraro, et al., claims a transparent infrared absorbing glass having at least 0.45 Wt. % iron expressed as $Fe_2O_3$, forming a glass into a flat glass product. The oxidation-reduction conditions are controlled in a stage of the production process and in subsequent stages to yield a glass having at least 35% of the iron in the ferrous state expressed as FeO and which when formed into a flat glass product of suitable thickness exhibits the combination of luminous transmittance of at least 65%. U.S. Pat. No. 5,077,133 by Cheng claims a glass having a final infrared transmittance of no more than 15% composition that includes 0.51% to 0.96% of $Fe_2O_3$, 0.15% to 0.33% of FeO and 0.2% to 1.4% of $CeO_2$, wherein the percentage by weight of FeO represents a percentage reduction of the total iron, expressed as $Fe_2O_3$, from 23% to 29%, so that the glass has an illuminating wavelength of C, from 498 to 525 nanometers (nm) and a hue purity of 2% to 4%.

In order to obtain the latter, U.S. Pat. No. 5,112,778, also Cheng, indicates that the redox reaction is balanced between the ferric and ferrous oxides, the cerium oxide and the coal in a soda-lime-silica glass changes to a state of a greater reduction when the content of total iron is increased up to a 0.05% to a 0.8%. The reason for which the ferrous value increases instead of decreasing, a situation that was expected. Consequently, in order to change the reduction state so as to obtain the same ferrous value found in the lesser concentration of the total iron, the quantity of coal added to the smelting furnace, which has a total content of iron, must be diminished, a statement which is contrary to the teaching of the prior art, i.e. it will require less coal for a high content of total iron in the formulation of the soda-lime-silica glass.

The main disadvantage of the glasses described in the Cheng patents is, as has already been mentioned, they necessarily include the $CeO_2$ as an agent to control the reduction for the formulation, mainly the $Fe_2O_3$. Another disadvantage of the use of cerium oxide as a required component is the high cost as a raw material.

It is well known that copper has played an important part in the production of glass, ceramics and colored pigments. For example, the coloration of the Persian ceramics has been recognized for its color conferred by copper. Of special interest for ceramic artists are the turquoise blue and especially the Egyptian and Persian dark blue colors (Waldemar A. Weil; Colored Glasses, Society of Glass Technology, Great Britain, P. 154-167, 1976).

Copper has been used in glass compositions, not only in those of soda-lime-silica type, but in some others, such as those containing borosilicate, for example. Therefore, the developed color depends on the base glass, on its concentration and its oxidation state.

It has been verified that for industrial production it is feasible to add CuO in minor concentrations to 120 ppm for a glass thickness of 4.0 mm and less than 100 ppm for a glass thickness of 6.0 mm.

The glass also can be manufactured with a thickness from about 3.5 millimeters to about 4 mm. If higher concentrations of CuO are present within the float chamber, a reduction process in the atmosphere could occur, presenting a red coloration on the glass surface. This effect, related to the residence time and the advancing velocity of the glass ribbon, can be intense and observable on the glass surface.

In the case of a soda-lime-silica type base glass, copper in oxide form imparts a coloration of a greenish blue hue, specifically turquoise, however, in glass, copper can be in its monovalent state, which does not impart any color. So, the greenish blue coloration depends not only on the amount of copper present, but on the ionic balance between the cuprous and cupric states. The maximum absorption of copper oxide is in a band centered at 780 nm and a weak secondary peak is present at 450 nm, which disappears at high soda content (about 40% by weight) (C. R. Bamford, Colour Generation and Control in Glass, Glass Science and Technology, Elsevier Scientific Publishing Company, P. 48-50, Amsterdam, 1977).

Another known ingredient present in the soda-lime silica glass is sulfuric trioxide ($SO_3$). Sodium sulfate ($Na_2SO_4$) is added to the raw materials batch of the glass as a refining agent at a high temperature, which is used principally as an agent for bubble elimination, promotes mass transport, and attacks free silica at the surface of the glass.

During the manufacture of the glass, the $Na_2SO_4$, which is the main contributor of sulfur in the glass, converts into $SO_3$, which controls the conversion of the $Fe_2O_3$ into FeO. However, the $SO_3$ present in the final glass does not affect the ability of the glass to transmit visible light.

The amount of $SO_3$ dissolved in the glass decreases if it has:
1. A lower quantity (proportionally) of sodium sulfate.
2. Greater melting properties
3. Greater melting times.
4. A furnace environment that has greater oxidation action.
5. Greater reduction of iron to ferrous oxide (greater $Fe^{2+}$; lesser $Fe^{3+}$) arriving at a minimum of 70-75% of the $Fe^{2+}$.

Therefore, the quantity and effects of the $SO_3$ in the glass batch has to be balanced in accordance with the amount of carbon present in the glass batch.

Furthermore, it is common knowledge that $SO_3$ in the glass batch must be within certain critical quantities because lower amounts of $SO_3$ in the glass batch will affect the refining properties, i.e. the ability to eliminate bubbles in the melting furnace.

The U.S. Pat. No. 10,011,521 B2 Nagai et al., describes a colored glass, using $Fe_2O_3$ as a principal colorant which provides a blue or green transmitted light in the proportion of 0.001 to 5% calculated as total iron $Fe_2O_3$, the principal use of $SO_3$ is to be as a refining agent in the melting glass, in the proportion of total sulfur from 0.005 to less than 0.025% for a thickness of 4 mm; the use of $SnO_2$ in this glass is to be a buffering agent for the oxidation-reduction reaction of iron and sulfur, in the proportion of total tin from 0.001 to 5%. The glasses of this patent have a solar transmittance $T_e$ at most 65%, a light transmittance $T_v$ (by illuminant A, 2° visual field) at least 60%, for a 4 mm thickness glass, as defined in JIS R3106 (1998).

In the U.S. Pat. No. 6,030,911 of Scheffler-Hudlet, et al., issued on Feb. 29, 2000, which has a glass redox from 0.202 to 0.237% of FeO; expressed as $Fe_2O_3$; a critical amount of 0.15 to 0.18% of $SO_3$ which does not affect the refining properties and ability of the $SO_3$ to eliminate bubbles, another U.S. Pat. No. 6,350,712 of Cabrera, issued on Feb. 26, 2002 in which iron oxide, titanium oxide and chromium oxide are used as main components. The titanium oxide compound is present in an amount of 0.0 to 0.30 Wt. % and chromium oxide from about 0.01 to 0.03 Wt. %.

The U.S. Pat. No. 5,077,133, Cheng, et al. uses a combination of moderately reduced iron, and ceric oxide. The resultant glass exhibits an illuminant A visible light transmittance ($T_{LA}$) greater than 70%, a total solar energy transmittance less than about 46%, and an ultraviolet radiation transmittance less than about 38%, at glass thickness in the range of 3 mm to 5 mm, and a color purity of from about 2% to about 4%, using a composition of total iron $Fe_2O_3$ from 0.51 to 0.96%, FeO from 0.15 to 0.33%, and $CeO_2$ from about 0.2 to about 1.4%.

The glasses in the U.S. Pat. No. 5,700,579 by Jeanvoine et al., describes a glass composition of total iron $Fe_2O_3$ from 0.75 to 1.4%, FeO from 0.25 to 0.32%, a total light transmission factor under illuminant A ($T_{LA}$) of at least 70%, a total energy transmission ($T_S$) less than approximately 46% and a transmission factor for ultraviolet radiation ($T_{UV}$) less than approximately 25%, at a thickness of between approximately 3 and 3.3 millimeters. The addition of $B_2O_3$ from 0 to 5%, Ce 0.1% and $TiO_2$ 0.1% confer the glasses other properties.

The glass proposed in the U.S. Pat. No. 5,776,845 by Boulos et al., consists of greater than 0.5 to 1.5 wt. % total iron oxide as $Fe_2O_3$; wherein the weight ratio of $Fe^{2+}/Fe^{3+}$ is less than 0.35; 0.10 to 2.00 wt. % manganese compound as $MnO_2$; and optionally any of: up to 1.00 wt. % titanium oxide as $TiO_2$, up to 1.00 wt. % cerium oxide as $CeO_2$; up to 1.00 wt. % vanadium oxide as $V_2O_5$; and up to 0.20 et. % chromium oxide as $Cr_2O_3$; the glass composition having, at 4.00 mm thickness: 55 to 80% light transmittance using illuminant A with less than 46% ultraviolet transmittance measured over the range of 300 to 400 nanometers.

The U.S. Pat. No. 5,830,812 by Shelestak, et al., describes a green colored glass using a standard soda-lime-silica glass base composition and additionally iron, cerium, chromium and, optionally, titanium as infrared and ultraviolet radiation absorbing materials and colorants. Preferably, the glass has a green color characterized by a dominant wavelength in the range of about 500 to 565 nanometers with an excitation purity of no higher than about 5% and includes about 0.50 to 1.0 Wt. % total iron, about 0.26 to 0.65 Wt. % $Fe_2O_3$, about 0.05 to 3 Wt. % $CeO_2$; 0 to about 2 Wt. % $TiO_2$, and about 20 to 650 ppm $Cr_2O_3$. The redox ratio for the glass is maintained between about 0.20 to 0.55 and preferably between 0.20 and 0.30. The glass compositions disclosed in the present invention have an $L_{TA}$ of at least about 65%, preferably at least 70%, a $T_{SUV}$ of no greater than 38%, preferably no greater than 35%, a TSIR of no greater than about 35%, preferably no greater than about 30%, and a TSET of no greater than about 60%, preferably, no greater than about 45%.

The Shelestak patent uses the oxides of titanium and mainly cerium, as colorants, and when they are used in combination with the $Fe_2O_3$, it is possible to obtain an additional reduction of the ultraviolet light transmission to a point where the sought for visibility transmission is achieved. It has a disadvantage regarding its high cost, which makes the formulation very expensive, and tends to oxidize the iron to $Fe_2O_3$.

In addition, while the use of $CeO_2$ in quantities from 0.05 to 3.0%, provides absorption of ultraviolet radiation, it has the disadvantage that it tends to change the most desirable green color to an unacceptable yellowish hue.

The U.S. Pat. No. 6,589,897 B1 by Foguenne, presented a composition for green glass from 0.7 to 1.3% of total iron expressed as $Fe_2O_3$, 0.18 to 0.25% of FeO, 0 to 0.0040% of Co, 0.0050 to 0.15% of $V_2O_5$, 0.0015 to 0.0250% of $Cr_2O_3$, and a light transmission under illuminant "A" for a glass thickness of 4 mm ($T_{LA}$) of between 40 and 70%, a selectivity (SE) of greater than or equal to 1.5, an ultraviolet radiation transmission ($T_{UV}$) of less than 20%, and a dominant wavelength ($\lambda_D$) for a glass thickness of 5 mm of greater than 490 nm.

In the patent U.S. Pat. No. 6,753,280 B2, Seto et al., the glasses presented are known for uses $Li_2O$ from 0.001 to 2%, as colorant, 0.4 to 2% total iron expressed as $Fe_2O_3$ ($T-Fe_2O_3$) wherein FeO expressed as $Fe_2O_3$ is 15 to 60% of $T-Fe_2O_3$. The glass has visible light transmittance using illuminant "A" ($T_{LA}$) of not less than 70%, and total solar transmittance ($T_{TS}$) of not greater than 60%, then the glass has a thickness between 2.1 mm and 6 mm.

The U.S. Pat. No. 7,632,767 B2, Nagashima et al., uses a composition $SiO_2$ from 65 to 75%, $B_2O_3$ from 0 to 5%, $Al_2O_3$ from 0 to 5%, MgO from 0 to 2%, CaO from 10 to 15%, SrO from 0 to 10%, BaO from 0 to 10%, $Li_2O$ from 0 to 5%, $Na_2O$ from 10 to 15%, $K_2O$ from 0 to 5%, $TiO_2$ from 0 to 0.5 and the following components, total iron expressed as $Fe_2O_3$ from 0.4 to 1.0%, $CeO_2$ from 0 to 2.0% wherein a mass ratio of FeO expressed as $Fe_2O_3$ to $T-Fe_2O_3$ ($FeO/T-Fe_2O_3$) is 20 to 44%. Wherein the visible illuminant "A" light transmission ($T_{LA}$) of at least 80% and a total solar energy transmittance ($T_G$) of 62% or lower for a sheet shape with a thickness of at least 1.3 mm but less than 2.5 mm and for a sheet shape with a thickness between 2.5 mm and 6 mm wherein the visible illuminant "A" light transmission ($T_{LA}$) of at least 70%, a total solar energy transmittance ($T_G$) of 55% or lower and an ultraviolet transmittance ($T_{UV}$) of 15% or lower. In the case for laminated glass, wherein the laminated glass has a visible illuminant "A" light transmission ($T_{LA}$) of at least 70%, and a total solar energy transmittance ($T_G$) of 45%.

The glasses described in the U.S. Pat. No. 7,682,999 B2 Teyssedre, has a composition of total iron expressed as $Fe_2O_3$ from 0.7 to 1.6%, $CeO_2$ from 0.1 to 1.2% and $TiO_2$ from 0 to 1.5%, having a redox factor of 0.23 or less, these glasses have a light transmission ($T_{LA}$) of 65% or higher, an energy transmission ($T_E$) of 46% or less for a thickness of 3 to 5 mm.

The glasses described in the U.S. Pat. No. 9,573,841 B1, Cid-Aguilar et al., uses a composition from 0.5 to 1.30% of total iron expressed as $Fe_2O_3$; from 0.12 to 0.450% of FeO expressed as $Fe_2O_3$; from about 0.04 to 1.8% selected from $TiO_2$ or $FeTiO_3$; abut 0.2 to 2% $CeO_2$; about 0.0004 to 0.015% CuO; and about 0.01 to 0.1% C, wherein the glass composition having an illuminant "A" light transmission ($T_{LA}$) greater of 70%, a total solar energy transmittance (Ts ISO13837) of less than or equal to 60%, a solar ultraviolet transmittance (Tuv ISO0959 v1990) of less than 15%, a dominant wavelength from 485 nm to 570 nm, and excitation purity of less than 11, at a thickness of 3 to 5 mm.

Today car manufacturers attempt to make more efficient automobiles to meet the new gas emission standards.

One way to reduce the total weight of a vehicle is to reduce the windshield thickness by using thinner glass sheets; however, a large reduction in the thickness may not only raise concern about safety, but also reduce its contribution to the torsional stiffness of the vehicle which is approximately 10 percent of the total torsional stiffness with the current windshield thickness. P. K. Mallick, in the book Advanced materials in automotive engineering, Chapter 2.7, (Woodhead Publishing Limited, 2012).

This issue can be solved by using glasses with better resistance and strength, such as borosilicate glass, alkali aluminosilicate glass or chemically strengthened glass in a hybrid glazing system.

Another concern that arises is the high noise levels due to the reduction of thickness of these windshields, one way to solve it is using acoustic polyvinyl butyral (PVB), achieving superior noise reduction for glazing, Cleary, T., Huten, T., Strong, D., and Walawender, C., "Reliability Evaluation of Thin, Lightweight Laminates for Windshield Applications," SAE Int. J. Passeng. Cars—Mech. Syst.

As referred to in the article by Leonhard, T., Clearly, T. Moore, M., Seyler, S. et al., "Novel Lightweight Laminate Concept with Ultrathin Chemically Strengthened Glass for Automotive Windshields," SAE Int. J. Passeng. Cars—Mech Syst. where a thickness change from 5.0 mm to 4.5 mm is proposed for a windshield, in this case using an asymmetric construction using a layer of 2.1 mm and another of 1.6 mm, the principal benefit is the total percentage of weight reduction of 11.8%, it means 17.5 kg less, compared to a symmetrical windshield of two layers of 2.1 mm glass and a PVB of 0.76 mm for an average covered area of 1.4 $m^2$; using a glass density of 2.5 $gr/cm^3$.

The U.S. Pat. No. 9,616,641 B2, Cleary et al., mentions a glass laminate comprising an external glass sheet, that can be a thin chemically-strengthened glass sheet or can be a non-chemically strengthened glass sheet, an internal glass sheet that can be a non-chemically-strengthened glass sheet or a thin chemically strengthened glass sheet, and a polymer interlayer formed between the external glass sheet and the internal glass sheet, and can have a thickness of less than 1.6 mm. And the glass laminate structure, wherein the internal glass sheet comprises 60-70 mol. % $SiO_2$; 6-14 mol. % $Al_2O_3$; 0-15 mol. % B203; 0-15 mol. % $Li_2O$; 0-20 mol. % $Na_2O$: 0-10 mol. % $K_2O$; 0-8 mol. % MgO; 0-10 mol. % CaO; 0-5 mol % $ZrO_2$; 0-1 mol. % $SnO_2$; 0-1 mol. % $CeO_2$; less than 50 ppm $As_2O_3$, and less than 50 ppm $Sb_2O_3$; wherein 12 mol. %≤($Li_2O+Na_2O+K_2O$)≤20 mol. % and 0 mol. %≤(MgO+CaO)≤10 mol. %. 22. The glass laminate structure, wherein the internal glass sheet comprises 64-68 mol. % $SiO_2$; 8-12 mol. % $Al_2O_3$; 0-3 mol. % $B_2O_3$; 0-15 mol. % $Li_2O$; 12-16 mol. % $Na_2O$; 2-5 mol. % $K_2O$; 4-6 mol. % MgO; and 0-5 mol. % CaO; where in 66 mol. % ≤($SiO_2+B_2O_3+CaO$)≤69 mol. %. ($Na_2O+K_2O+B_2O_3+MgO+CaO+SrO$)>10 mol. %, 5 mol. %≤MgO+CaO+SrO≤8 mol. %, ($Na_2O+B_2O_3$)—$Al_2O_3$≤2 mol. %, 2 mol. %≤ ($Na_2O$—$Al_2O_3$)≤6 mol. %, and 4 mol. %≤($Na_2O+K_2O$)— $Al_2O_3$≤10 mol. %. The physical properties of the chemically-strengthened glass can have a surface compressive stress between 250 and about 900 MPa, and/or a central tension greater than 40 MPa but less than 100 MPa and can range in thickness from 0.5 to 1.0 mm.

The modulus of elasticity can range from about 60 GPa to 85 GPa. The modulus of elasticity of the glass sheet(s) and the polymer interlayer can affect both the mechanical properties (e.g., deflection and strength) and the acoustic performance (e.g., transmission loss) of the resulting glass laminate.

The invention mentioned by Cleary, explains the principal characteristics necessary to produce an automotive glazing with improved strength and reduced weight, through the use of chemically-strengthened glass and a polymer interlayer, but does not address the optical properties required to meet the safety transmittance standard and solar performance parameters required in the automotive industry.

Objectives of the Invention

According to the present invention, there is provided a soda-lime-silica glass composition, and a colorant portion, in weight, comprising: from 1.30 to 2.50% of total iron expressed as $Fe_2O_3$; from 15 to 40% of $Fe^{2+}$ (Ferrous) and from 0.15 to 0.65% of FeO, expressed as $Fe_2O_3$; from about 0.05 to about 0.30% of $SO_3$; from about 0.02 to about 1.0% of $TiO_2$; from about 0.0002 to about 0.03% of $Cr_2O_3$; and from about 0.0002 to about 0.015% of CuO, wherein the glass composition having an illuminant "A" light transmission ($T_{LA}$) greater than 70%, a direct solar transmittance ($T_{DS}$) of less than 51%, a total UV light transmittance ($T_{UV}$) of less than 40% and a total solar transmittance ($T_{TS}$) of less than 63%; a dominant wavelength from 490 nm to 600; and excitation purity less than 7, for thickness from about 0.7 to 3.0 mm.

The main objective in the present invention is to offer a range of solar control compositions, for monolithic glass in thicknesses from about 0.7 to 3.0 mm, with equivalent solar performance. This glass composition maintains solar performance with thinner glass that allows for weight reduction in vehicles.

It is another objective in the present invention to offer a solar control thin glass to achieve a lightweight laminated glazing system. In most cases it can be symmetric-hybrid or asymmetric-hybrid laminated systems with a total thickness from about 2.3 to 5.0 mm, which can be constructed with commercial soda-lime-silica clear glasses, low iron content glasses or some other base composition, such as borosilicate or alkali aluminosilicate including ion exchanged and not ion exchanged glasses and a polymer interlayer of conventional or acoustic polyvinyl butyral (PVB).

Another important objective is that this glass must meet the regulations of the US. Federal Motor Vehicle Safety Standard, which requires a light transmission greater than 70%.

DETAILED DESCRIPTION OF THE INVENTION

The typical composition of soda-lime-silica glass formed by the float glass process for the automotive industry is characterized by the following formulation based on the percentage by weight with respect to the total weight of the glass, these percentages were obtained by using x-ray fluorescence analysis.

| By weight | (%): |
|---|---|
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The green glass composition of the present invention is based on the composition described above to which the following coloring compounds have been added: 1.30 to 2.50% of total iron expressed as $Fe_2O_3$; from 15 to 40% of $Fe^{2+}$ (Ferrous) and from 0.15 to 0.65% of FeO, expressed as $Fe_2O_3$; from about 0.05 to about 0.30% of $SO_3$; from about 0.02 to about 1.0% of $TiO_2$; from about 0.0002 to about 0.03% of $Cr_2O_3$; and from about 0.0002 to about 0.015% of CuO.

The green glass having an illuminant "A" light transmission ($T_{LA}$) greater than 70%, a direct solar transmittance ($T_{DS}$) of less than 51%, and a total UV light transmittance ($T_{UV}$) of less than 40% and a total solar transmittance ($T_{TS}$) of less than 63%, wherein the glass has a thickness from about 0.7 to 3.0 mm.

In recent years the trend in the automotive industry has been to reduce the thickness of glass without sacrificing the thermal performance of the products, so, for example, we can find in the automotive market tempered solar control products with light transmission greater than the 70% required by the Federal Standard ANSI Z 26.1 in thicknesses ranging from 4.85 to 3.2 mm, which means that the composition is adjusted for each thickness to achieve a targeted thermal performance or equivalent solar control.

As it is known, solar control glass is a term that applies to glass that allows the visible light coming from the sun to pass through glazing systems (windows and windshields) and at the same time, absorbs or reflects much of the sun's heat to the exterior. In the case of glazing systems for driver's vision, such as front doors and the automobile windshield, the transmission of visible light must comply with the Federal standard of greater than 70%. On the other hand, minimum values of solar and ultraviolet transmission are sought, such that this glass composition keeps the interior of the vehicle or houses more comfortable than it would be if conventional glass was used. Therefore, lower energy consumption is required in air conditioning systems, which results in less pollution and cost reduction.

To achieve the described characteristics, the present invention defines the correct mixture of iron oxide ($Fe_2O_3$)—Redox (Ferrous) to give greenish coloration and reduce ultraviolet ($T_{UV}$) and solar ($T_S$) transmission, titanium oxide ($TiO_2$) to contribute to the blocking of ultraviolet radiation and copper oxide (CuO) as coloring agents in order to adjust the yellowish tint that may be conferred by the addition of titanium oxide. However, high concentrations of CuO negatively impact visible transmission.

The calculation of the ultraviolet radiation transmission ($T_{UV}$), involves only the participation of the solar UV radiation, so that it is evaluated in the range 300 to 400 nm of wavelength using intervals of 5 nm and air mass equals 1.5 ISO 13837 convention A standard.

The physical properties such as light transmission correspond to calculated variables based on internationally accepted standards. So that, the light transmission is evaluated using the illuminant "A" ($T_{LA}$) and standard observer of 2 degree also known as 1931 [C.I.E. Publication, 15.2, ASTM E-308 (1990)]. The wavelength range used for this purpose is from 380 to 780 nm, integrating values in numeric form with intervals of 10 nm.

In the infrared transmission (TR) calculation the range is comprised of the radiation in the solar spectrum, having a range of 800 to 2500 nm, with intervals of 50 nm, using the values of ISO/DIS 13837.

The direct solar transmittance ($T_{DS}$) represents the heat which the glass transmits in direct form, evaluating it from 300 nm to 2500 nm with intervals of 5, 10, and 50 nm, the numeric form of calculation uses as recognized standard values by ISO 13837 standard (air mass 1.5 300 to 2500 nm trapezoidal intervals).

The total solar energy transmission ($T_{TS}$) was evaluated in the range of 300 to 2500 nm considering wind speed of 4 m/s (parked), in accordance with ISO/DIS 13837.

The specifications for the determination of color such as the dominant wavelength and the purity of excitement have been derived from the tristimulus values (X, Y, Z), which have been adopted by the International Commission of Illumination (C.I.E.), as direct result of experiments involving many observers. These specifications could be determined by the calculation of the three-chromatic coefficients X, Y, Z of the tristimulus values that corresponding to the red, green and the blue colors, respectively. The three-chromatic values were plotted in the chromaticity diagram and compared with the coordinates of the illuminant "D65" considered as illumination standard. The comparison provides the information in order to determine the color purity excitement and it is dominant wavelength. The dominant wavelength defines the wavelength of the color and it is value located in the visible range, of the 380 to 780 nm, while for the purity of excitement, the less the value is, the nearest tends to be a neutral color. A deeper understanding of the topics can be obtained from the "Handbook of Colorimetry" published by the "Massachusetts Institute of Technology", of Arthur C. Hardy, Issued in 1936.

The color variables L*, a* and b* of the color system CIELAB 1976, are also calculated through the tristimulus values.

The following are examples of soda-lime-silica compositions for monolithic and laminated sheets in accordance with the present invention having corresponding physical properties of visible light ($T_{LA}$), UV light ($T_{UV}$), infrared ($T_{IR}$), direct solar ($T_{DS}$) and total solar transmittance ($T_{TS}$).

The composition of the following glasses was calculated by x-ray fluorescence.

Table 1, examples 1 to 27, describe solar control thin green glass compositions at actual thickness of about 1.2 to about 4 mm, which maintain solar performance such as thinner glass and can be used to reduce weight in vehicles.

TABLE 1

|  | Ex1 | Ex2 | Ex3 | Ex4 | Ex5 | Ex6 | Ex7 | Ex8 |
|---|---|---|---|---|---|---|---|---|
| Colorants percent by weight | | | | | | | | |
| $SiO_2$ | 69.4 | 69.4 | 70.7 | 70.1 | 69.9 | 70.4 | 69.7 | 69.7 |
| $Na_2O$ | 13.2 | 13.2 | 13.2 | 13.2 | 13.0 | 13.2 | 13.3 | 13.3 |
| $K_2O$ | 0.4 | 0.4 | 0.3 | 0.3 | 0.4 | 0.4 | 0.4 | 0.4 |
| CaO | 9.4 | 9.4 | 8.5 | 9.1 | 9.3 | 8.9 | 9.3 | 9.3 |
| MgO | 4.7 | 4.7 | 4.3 | 4.6 | 4.7 | 4.5 | 4.7 | 4.7 |
| $Al_2O_3$ | 0.77 | 0.77 | 0.79 | 0.78 | 0.79 | 0.81 | 0.79 | 0.79 |
| $SO_3$ | 0.26 | 0.26 | 0.22 | 0.23 | 0.22 | 0.22 | 0.25 | 0.25 |
| $Fe_2O_3$ | 1.77 | 1.77 | 1.75 | 1.64 | 1.60 | 1.46 | 1.47 | 1.47 |
| Ferrous | 30.0 | 30.0 | 27.7 | 28.5 | 27.7 | 28.3 | 27.4 | 27.4 |
| FeO | 0.532 | 0.532 | 0.485 | 0.466 | 0.444 | 0.413 | 0.404 | 0.404 |
| $TiO_2$ | 0.057 | 0.057 | 0.059 | 0.057 | 0.057 | 0.059 | 0.059 | 0.059 |
| $Cr_2O_3$ | 0.0007 | 0.0007 | 0.0007 | 0.0007 | 0.0009 | 0.0009 | 0.0007 | 0.0007 |
| Solar Properties | | | | | | | | |
| Thickness (mm) | 1.2 | 1.3 | 1.4 | 1.5 | 1.6 | 1.8 | 1.8 | 1.9 |
| $T_{UV}$ | 32.0 | 30.1 | 29.7 | 30.8 | 30.5 | 31.1 | 31.1 | 29.9 |
| $T_{LA}$ | 72.6 | 71.3 | 71.5 | 71.7 | 71.4 | 71.4 | 71.8 | 70.8 |
| $T_{DS}$ | 51.2 | 49.1 | 49.4 | 49.1 | 48.6 | 47.9 | 48.4 | 47.0 |
| $T_{IR}$ | 35.7 | 33.1 | 33.5 | 32.5 | 31.9 | 30.4 | 31.1 | 29.3 |
| $T_{TS}$ | 63.0 | 61.5 | 61.7 | 61.5 | 61.1 | 60.6 | 61.0 | 59.9 |
| L* | 88.8 | 88.2 | 88.2 | 88.3 | 88.2 | 88.3 | 88.4 | 88.0 |
| a* | −5.6 | −6.0 | −6.0 | −6.1 | −6.3 | −6.6 | −6.5 | −6.9 |
| b* | 3.0 | 3.2 | 3.5 | 3.1 | 3.0 | 2.7 | 2.7 | 2.9 |
| % Pe | 2.2 | 2.4 | 2.6 | 2.3 | 2.2 | 2.1 | 2.1 | 2.2 |
| Dw (nm) | 529.0 | 529.1 | 532.7 | 526.3 | 523.8 | 516.1 | 517.2 | 517.1 |

|  | Ex9 | Ex10 | Ex11 | Ex12 | Ex13 | Ex14 | Ex15 | Ex16 |
|---|---|---|---|---|---|---|---|---|
| Colorants percent by weight | | | | | | | | |
| $SiO_2$ | 69.8 | 70.9 | 70.6 | 72.4 | 70.6 | 70.3 | 71.3 | 71.1 |
| $Na_2O$ | 13.2 | 13.6 | 14.6 | 13.3 | 13.7 | 13.5 | 13.1 | 14.0 |
| $K_2O$ | 0.4 | 0.4 | 0.3 | 0.4 | 0.3 | 0.4 | 0.3 | 0.3 |
| CaO | 9.3 | 8.5 | 7.7 | 7.2 | 8.7 | 8.9 | 8.2 | 8.0 |
| MgO | 4.8 | 4.3 | 4.2 | 4.0 | 4.4 | 4.5 | 4.5 | 4.2 |
| $Al_2O_3$ | 0.79 | 0.69 | 0.64 | 0.70 | 0.67 | 0.81 | 0.69 | 0.64 |
| $SO_3$ | 0.24 | 0.19 | 0.30 | 0.24 | 0.19 | 0.22 | 0.25 | 0.27 |
| $Fe_2O_3$ | 1.30 | 1.32 | 1.55 | 1.74 | 1.20 | 1.27 | 1.62 | 1.38 |
| Ferrous | 28.2 | 29.3 | 23.7 | 19.9 | 31.4 | 28.0 | 20.0 | 24.3 |
| FeO | 0.366 | 0.385 | 0.367 | 0.345 | 0.378 | 0.357 | 0.325 | 0.335 |
| $TiO_2$ | 0.059 | 0.194 | 0.044 | 0.049 | 0.189 | 0.058 | 0.048 | 0.044 |
| $Cr_2O_3$ | 0.0008 | 0.0004 | 0.0005 | 0.0005 | 0.0005 | 0.0008 | 0.0005 | 0.0005 |
| Solar Properties | | | | | | | | |
| Thickness (mm) | 2.1 | 2.1 | 2.1 | 2.1 | 2.2 | 2.3 | 2.3 | 2.4 |
| $T_{UV}$ | 31.9 | 35.9 | 30.1 | 28.6 | 35.7 | 30.6 | 29.5 | 30.5 |
| $T_{LA}$ | 71.7 | 72.1 | 71.4 | 71.5 | 71.5 | 70.7 | 71.5 | 71.3 |
| $T_{DS}$ | 47.5 | 47.1 | 47.2 | 48.1 | 46.1 | 45.8 | 47.6 | 46.4 |
| $T_{IR}$ | 29.3 | 27.7 | 29.2 | 31.2 | 26.4 | 27.1 | 30.1 | 27.8 |
| $T_{TS}$ | 60.3 | 60.0 | 60.1 | 60.7 | 59.3 | 59.1 | 60.4 | 59.5 |
| L* | 88.5 | 88.7 | 88.3 | 88.2 | 88.5 | 88.1 | 88.3 | 88.3 |

TABLE 1-continued

| | | | | | | | | |
|---|---|---|---|---|---|---|---|---|
| a* | −7.0 | −7.2 | −7.0 | −6.6 | −7.5 | −7.4 | −6.9 | −7.3 |
| b* | 2.2 | 1.8 | 3.1 | 4.4 | 1.7 | 2.3 | 3.7 | 2.7 |
| % Pe | 2.1 | 2.3 | 2.3 | 3.5 | 2.5 | 2.2 | 2.8 | 2.2 |
| Dw (nm) | 506.5 | 502.1 | 519.8 | 538.7 | 500.2 | 506.9 | 529.5 | 511.8 |

| | Ex17 | Ex18 | Ex19 | Ex20 | Ex21 | Ex22 | Ex23 | Ex24 |
|---|---|---|---|---|---|---|---|---|
| Colorants percent by weight | | | | | | | | |
| $SiO_2$ | 71.5 | 72.1 | 70.2 | 70.2 | 72.9 | 71.8 | 70.1 | 72.4 |
| $Na_2O$ | 15.0 | 12.6 | 14.3 | 14.3 | 13.5 | 13.4 | 14.5 | 14.8 |
| $K_2O$ | 0.3 | 0.4 | 0.3 | 0.3 | 0.3 | 0.3 | 0.4 | 0.3 |
| CaO | 7.1 | 8.0 | 8.8 | 8.8 | 7.3 | 8.0 | 8.8 | 6.9 |
| MgO | 3.7 | 4.3 | 4.3 | 4.3 | 3.8 | 4.2 | 4.2 | 3.5 |
| $Al_2O_3$ | 0.63 | 0.70 | 0.66 | 0.66 | 0.66 | 0.63 | 0.65 | 0.63 |
| $SO_3$ | 0.26 | 0.23 | 0.20 | 0.20 | 0.23 | 0.24 | 0.21 | 0.24 |
| $Fe_2O_3$ | 1.44 | 1.62 | 1.07 | 1.07 | 1.31 | 1.29 | 0.99 | 1.14 |
| Ferrous | 24.5 | 18.8 | 33.2 | 33.2 | 23.1 | 22.3 | 31.5 | 26.7 |
| FeO | 0.353 | 0.305 | 0.355 | 0.355 | 0.303 | 0.288 | 0.311 | 0.304 |
| $TiO_2$ | 0.041 | 0.049 | 0.191 | 0.191 | 0.044 | 0.043 | 0.195 | 0.043 |
| $Cr_2O_3$ | 0.0004 | 0.0005 | 0.0004 | 0.0004 | 0.0004 | 0.0005 | 0.0004 | 0.0003 |
| Solar Properties | | | | | | | | |
| Thickness (mm) | 2.4 | 2.5 | 2.5 | 2.6 | 2.6 | 2.7 | 2.85 | 2.85 |
| $T_{UV}$ | 31.6 | 28.2 | 37.1 | 36.2 | 29.2 | 28.9 | 38.0 | 33.6 |
| $T_{LA}$ | 71.2 | 71.2 | 71.6 | 71.0 | 71.2 | 71.6 | 72.3 | 71.5 |
| $T_{DS}$ | 45.6 | 47.0 | 45.4 | 44.4 | 46.5 | 47.0 | 45.7 | 45.5 |
| $T_{IR}$ | 26.0 | 29.5 | 24.7 | 23.5 | 28.3 | 29.0 | 24.6 | 25.4 |
| $T_{TS}$ | 58.9 | 60.0 | 58.8 | 58.1 | 59.6 | 60.0 | 59.0 | 58.9 |
| L* | 88.3 | 88.1 | 88.8 | 88.5 | 88.2 | 88.4 | 89.1 | 88.0 |
| a* | −7.5 | −7.0 | −8.0 | −8.3 | −7.1 | −7.2 | −8.0 | −8.5 |
| b* | 2.3 | 4.0 | 0.5 | 0.5 | 3.7 | 3.3 | 0.4 | 1.3 |
| % Pe | 2.3 | 3.1 | 3.5 | 3.6 | 2.8 | 2.5 | 3.5 | 3.2 |
| Dw (nm) | 505.7 | 532.6 | 493.2 | 493.2 | 528.5 | 522.1 | 493.0 | 496.7 |

| | Ex25 | Ex26 | Ex27 |
|---|---|---|---|
| Colorants percent by weight | | | |
| $SiO_2$ | 71.9 | 72.6 | 72.1 |
| $Na_2O$ | 14.1 | 13.2 | 13.5 |
| $K_2O$ | 0.3 | 0.3 | 0.3 |
| CaO | 7.7 | 7.9 | 8.0 |
| MgO | 3.9 | 4.0 | 4.2 |
| $Al_2O_3$ | 0.63 | 0.67 | 0.75 |
| $SO_3$ | 0.26 | 0.23 | 0.15 |
| $Fe_2O_3$ | 1.11 | 1.03 | 0.88 |
| Ferrous | 24.1 | 22.3 | 25.0 |
| FeO | 0.268 | 0.229 | 0.220 |
| $TiO_2$ | 0.044 | 0.045 | 0.065 |
| $Cr_2O_3$ | 0.0004 | 0.0004 | 0.0016 |
| Solar Properties | | | |
| Thickness (mm) | 3.1 | 3.6 | 4 |
| $T_{UV}$ | 32.7 | 30.2 | 33.3 |
| $T_{LA}$ | 71.9 | 71.7 | 72.1 |
| $T_{DS}$ | 46.3 | 46.0 | 45.1 |
| $T_{IR}$ | 26.7 | 26.8 | 23.9 |
| $T_{TS}$ | 59.5 | 59.3 | 58.6 |
| L* | 88.7 | 88.6 | 88.8 |
| a* | −7.7 | −7.8 | −8.0 |
| b* | 1.8 | 2.6 | 2.2 |
| % Pe | 2.5 | 2.3 | 2.5 |
| Dw (nm) | 500.4 | 508.7 | 503.2 |

Figure 1:
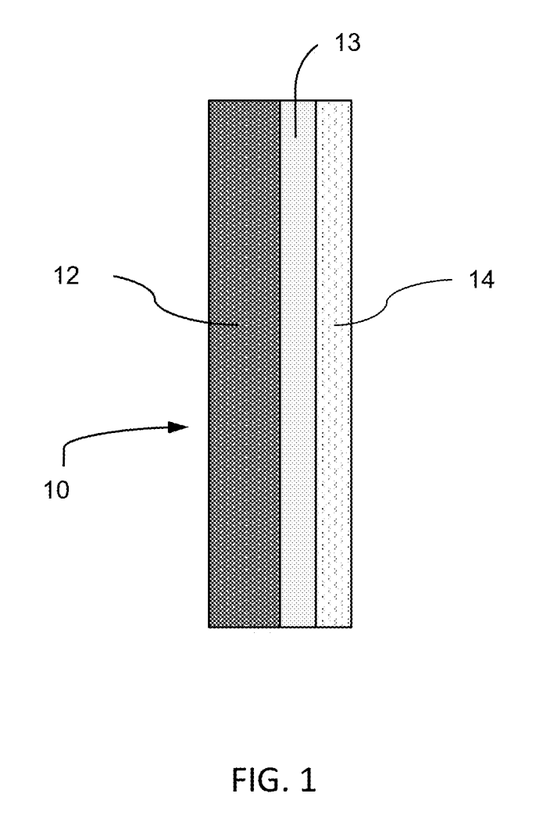
FIG. 1 shows the schematic diagram of a laminated glazing configuration.
Figure 2:
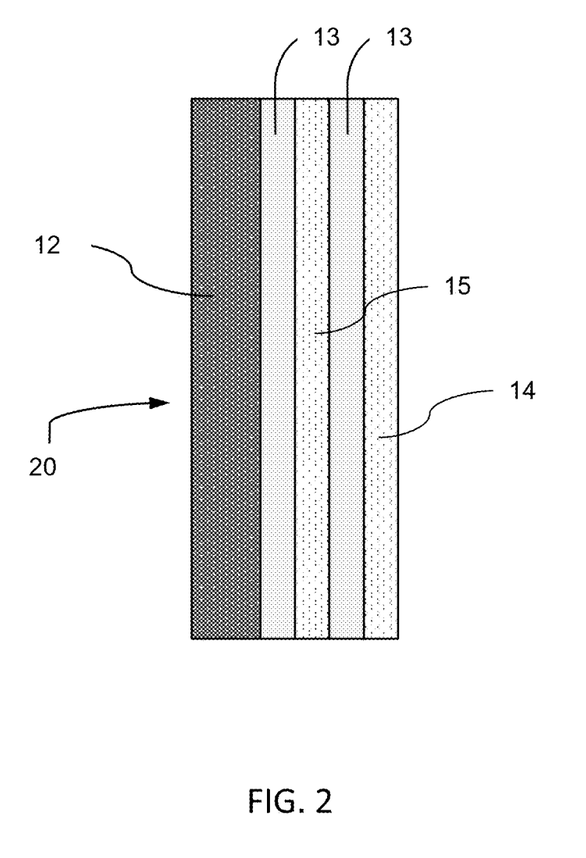
FIG. 2 shows another schematic diagram of a triple laminated glazing configuration.
Figure 3:
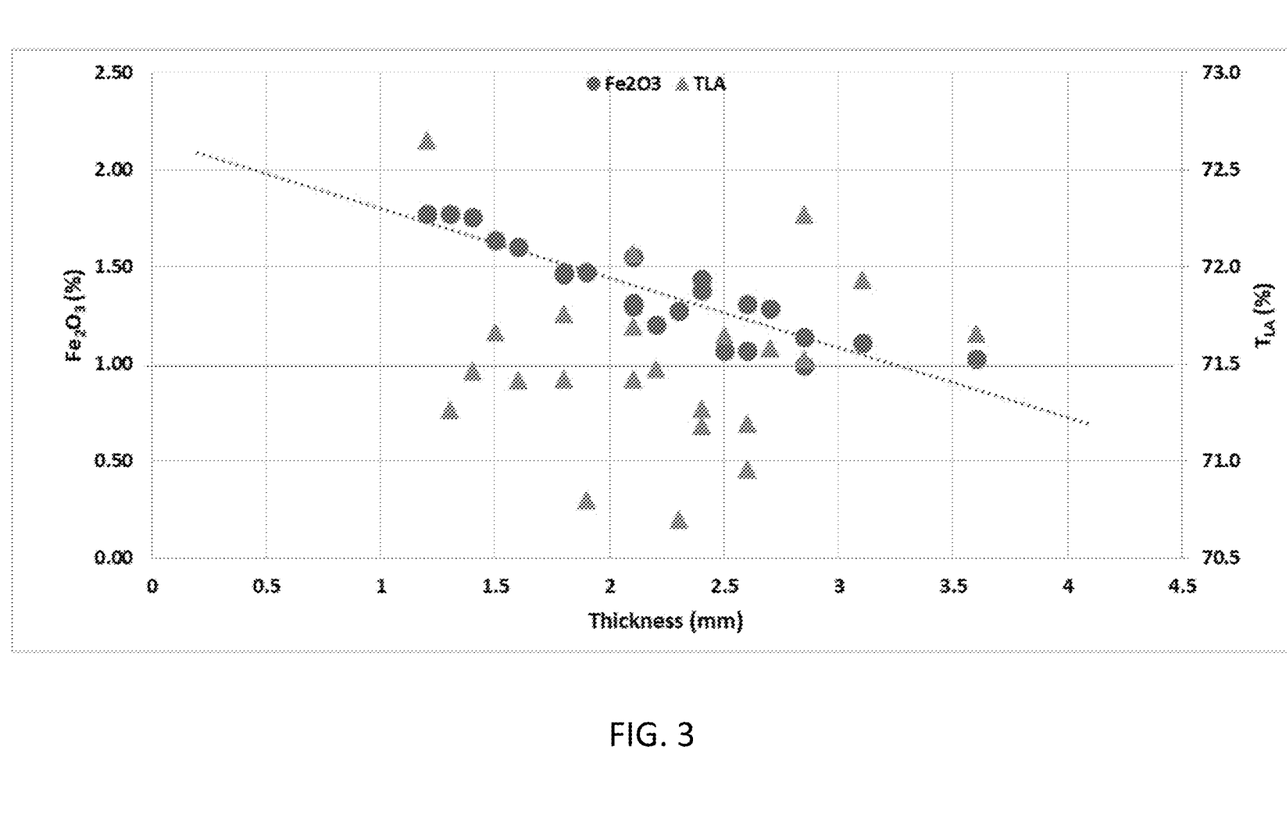
FIG. 3 is a graph showing the behavior of iron oxide if the thickness is reduced, for example to maintain the $T_{LA}$ greater than 70% with a thickness of 0.5 mm, a value close to 2% $Fe_2O_3$ is required considering that the ferrous is about 26.5%.
Figure 4:
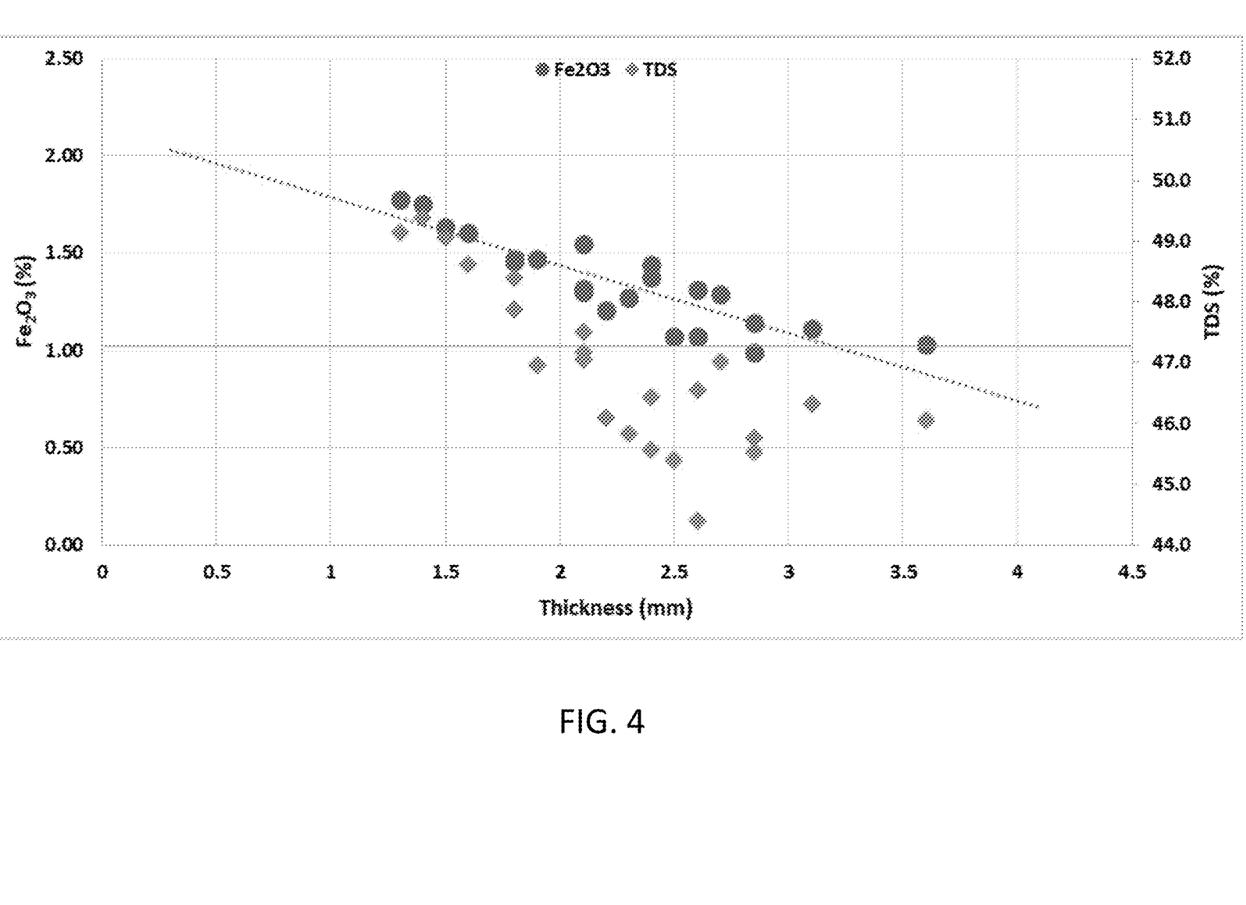
FIG. 4 is a graph showing the behavior of iron oxide if the thickness is reduced, for example to maintain the $T_{DS}$ less than 51%, with a thickness of 0.5 mm, a value close to 2% $Fe_2O_3$ is required considering that the ferrous is about 26.5%.

Making now reference to FIGS. 1 and 2, FIG. 1 shows a laminated glazing configuration in accordance with the examples of Tables 2 and 4; and FIG. 2, shows a laminated glazing configuration in accordance with the examples of Table 3.

In a first embodiment of the present invention (FIG. 1), the laminated glazing is formed by three layers (10). An outer ply (12) is a solar control thin green glass in accordance with the present invention, with a thickness from about 0.7 to 3.0 mm. A polymer interlayer (13) is a conventional or acoustic polyvinyl butyral, PVB, with a thickness of 0.76 mm. And an inner ply (14) can be constructed of an ion exchanged and not ion exchanged commercial clear glass, of an ion exchanged and not ion exchanged borosilicate glass or of an ion exchanged and not ion exchanged alkali aluminosilicate glass (Corning Gorilla® Glass), with a thickness from about 0.5 mm to 2.0.

In a second embodiment, (FIG. 2), a triple laminated glazing configuration is formed by five layers (20). An outer ply (12) is a solar control thin green glass, with a thickness from about 0.7 to 3.0 mm. Two polymer interlayers (13) in which the polymer interlayer (13) is a conventional or acoustic polyvinyl butyral, PVB, with a thickness of 0.76 mm. The center ply (15) and the inner ply (14) can be constructed of an ion exchanged and not ion exchanged commercial clear glass, of an ion exchanged and not ion exchanged borosilicate glass or of an ion exchanged and not ion exchanged alkali aluminosilicate glass (Corning Gorilla® Glass), with a thickness from about 0.5 mm to 2.0.

Table 2 shows solar control performance of thin green glass compositions laminated with commercial clear glass, as shown in FIG. 1. Ex 28 and 29 describe current typical automotive laminated glazing. Ex 30 to 59 using examples 20, 16, 11, 6, 5 and 3 for reducing the total thickness of laminated glass, while maintaining solar performance. All laminated systems were simulated via Optics 6 software, developed by Lawrence Berkeley Laboratory and using 0.76 mm thick commercial acoustic polymer interlayer (polyvinyl butyral, PVB).

TABLE 2

|  | Ex28 | Ex29 | Ex30 | Ex31 | Ex32 | Ex33 |
|---|---|---|---|---|---|---|
| Outer Ply 1 (mm) | TxPL 2.1 | TxPL 2.3 | 2.60 mm, Ex 20 | | | |
| Inner Ply 2 (mm) | TxPL 2.1 | TxPL 2.3 | Clear 1.4 | Clear 1.1 | Clear 1.0 | Clear 0.7 |
| Total Thickness mm | 5.00 | 5.40 | 4.76 | 4.46 | 4.36 | 4.06 |
| Solar Properties | | | | | | |
| $T_{UV}$ | 2.40 | 2.30 | 2.30 | 2.30 | 2.30 | 2.30 |
| $T_{LA}$ | 73.9 | 72.3 | 70.2 | 70.3 | 70.4 | 70.5 |
| $T_{DS}$ | 44.0 | 41.7 | 40.0 | 40.2 | 40.3 | 40.5 |
| $T_{IR}$ | 23.0 | 20.1 | 19.0 | 19.3 | 19.4 | 19.7 |
| $T_{TS}$ | 57.7 | 56.1 | 54.8 | 55.0 | 55.0 | 55.2 |
| L* | 89.7 | 89.0 | 88.1 | 88.1 | 88.2 | 88.2 |
| a* | −8.2 | −8.9 | −9.2 | −9.1 | −9.1 | −9.0 |
| b* | 2.6 | 2.7 | 1.7 | 1.7 | 1.7 | 1.8 |
| % Pe | 2.5 | 2.7 | 3.3 | 3.3 | 3.2 | 3.2 |
| Dw (nm) | 506.6 | 505.5 | 498.1 | 498.2 | 498.3 | 498.4 |

|  | Ex34 | Ex35 | Ex36 | Ex37 | Ex38 | Ex39 | Ex40 |
|---|---|---|---|---|---|---|---|
| Outer Ply 1 (mm) | 2.40 mm, Ex 16 | | | | | 2.10 mm, Ex 11 | |
| Inner Ply 2 (mm) | Clear 1.6 | Clear 1.4 | Clear 1.2 | Clear 1.0 | Clear 0.7 | Clear 1.8 | Clear 1.6 |
| Total Thickness mm | 4.76 | 4.56 | 4.36 | 4.16 | 3.86 | 4.66 | 4.46 |
| Solar Properties | | | | | | | |
| $T_{UV}$ | 2.10 | 2.10 | 2.10 | 2.10 | 2.10 | 2.10 | 2.10 |
| $T_{LA}$ | 70.5 | 70.6 | 70.7 | 70.8 | 70.9 | 70.6 | 70.7 |
| $T_{DS}$ | 41.9 | 42.0 | 42.2 | 42.4 | 42.6 | 42.4 | 42.5 |
| $T_{IR}$ | 22.5 | 22.8 | 23.0 | 23.2 | 23.6 | 23.5 | 23.7 |
| $T_{TS}$ | 56.2 | 56.3 | 56.5 | 56.6 | 56.7 | 56.6 | 56.7 |
| L* | 88.0 | 88.0 | 88.0 | 88.1 | 88.1 | 87.9 | 88.0 |
| a* | −8.3 | −8.2 | −8.2 | −8.1 | −8.0 | −8.0 | −7.9 |
| b* | 3.9 | 3.9 | 3.9 | 3.9 | 3.9 | 4.2 | 4.2 |
| % Pe | 2.9 | 2.9 | 2.9 | 2.9 | 2.9 | 3.2 | 3.2 |
| Dw (nm) | 522.3 | 522.7 | 523.1 | 523.5 | 524.1 | 528.4 | 528.8 |

|  | Ex41 | Ex42 | Ex43 | Ex44 | Ex45 | Ex46 | Ex47 |
|---|---|---|---|---|---|---|---|
| Outer Ply 1 (mm) | 2.10 mm, Ex 11 | | | | 1.80 mm, Ex 6 | | |
| Inner Ply 2 (mm) | Clear 1.4 | Clear 1.2 | Clear 1.0 | Clear 0.7 | Clear 1.8 | Clear 1.6 | Clear 1.4 |
| Total Thickness mm | 4.26 | 4.06 | 3.86 | 3.56 | 4.36 | 4.16 | 3.96 |
| Solar Properties | | | | | | | |
| $T_{UV}$ | 2.10 | 2.10 | 2.10 | 2.10 | 2.10 | 2.10 | 2.10 |
| $T_{LA}$ | 70.7 | 70.8 | 70.9 | 71.0 | 70.7 | 70.8 | 70.8 |
| $T_{DS}$ | 42.7 | 42.9 | 43.0 | 43.3 | 43.1 | 43.2 | 43.4 |
| $T_{IR}$ | 24.0 | 24.2 | 24.4 | 24.8 | 24.6 | 24.8 | 25.1 |
| $T_{TS}$ | 56.8 | 56.9 | 57.0 | 57.2 | 57.0 | 57.1 | 57.3 |
| L* | 88.0 | 88.0 | 88.0 | 88.1 | 88.0 | 88.0 | 88.0 |
| a* | −7.9 | −7.8 | −7.8 | −7.7 | −7.7 | −7.6 | −7.6 |
| b* | 4.2 | −7.8 | 4.3 | 4.3 | 3.9 | 3.9 | 3.9 |
| % Pe | 3.2 | 3.2 | 3.2 | 3.2 | 2.9 | 2.9 | 2.9 |
| Dw (nm) | 528.4 | 529.5 | 529.9 | 530.6 | 525.9 | 526.4 | 526.8 |

|  | Ex48 | Ex49 | Ex50 | Ex51 | Ex52 | Ex53 | Ex54 | Ex55 |
|---|---|---|---|---|---|---|---|---|
| Outer Ply 1 (mm) | 1.80 mm, Ex 6 | | | 1.60 mm, Ex 5 | | | | |
| Inner Ply 2 (mm) | Clear 1.2 | Clear 1.0 | Clear 0.7 | Clear 1.6 | Clear 1.4 | Clear 1.2 | Clear 1.0 | Clear 0.7 |
| Total Thickness mm | 3.76 | 3.56 | 3.26 | 3.96 | 3.76 | 3.56 | 3.36 | 3.06 |
| Solar Properties | | | | | | | | |
| $T_{UV}$ | 2.10 | 2.10 | 2.10 | 2.10 | 2.10 | 2.10 | 2.10 | 2.10 |
| $T_{LA}$ | 70.9 | 71.0 | 71.1 | 70.7 | 70.8 | 70.8 | 70.9 | 71.0 |
| $T_{DS}$ | 43.5 | 43.7 | 44.0 | 43.9 | 44.0 | 44.2 | 44.4 | 44.6 |

TABLE 2-continued

| | | | | | | | | |
|---|---|---|---|---|---|---|---|---|
| $T_{IR}$ | 25.3 | 25.6 | 26.0 | 26.2 | 26.4 | 26.7 | 27.0 | 27.4 |
| $T_{TS}$ | 57.3 | 57.5 | 57.7 | 57.6 | 57.7 | 57.8 | 58.0 | 58.1 |
| L* | 88.1 | 88.1 | 88.1 | 87.9 | 87.9 | 88.0 | 88.0 | 88.0 |
| a* | −7.5 | −7.5 | −7.4 | −7.3 | −7.3 | −7.2 | −7.1 | −7.1 |
| b* | 3.9 | 3.9 | 3.9 | 4.2 | 4.2 | 4.2 | 4.2 | 4.2 |
| % Pe | 2.9 | 2.9 | 2.9 | 3.2 | 3.2 | 3.2 | 3.2 | 3.3 |
| Dw (nm) | 527.2 | 527.7 | 528.3 | 532.2 | 532.6 | 533.1 | 533.5 | 534.1 |

| | Ex56 | Ex57 | Ex58 | Ex59 |
|---|---|---|---|---|
| Outer Ply 1 (mm) | 1.40 mm, Ex 3 | | | |
| Inner Ply 2 (mm) | Clear 1.6 | Clear 1.2 | Clear 1.0 | Clear 0.7 |
| Total Thickness mm | 3.76 | 3.36 | 3.16 | 2.86 |
| Solar Properties | | | | |
| $T_{UV}$ | 2.00 | 2.00 | 2.00 | 2.00 |
| $T_{LA}$ | 70.7 | 70.8 | 70.9 | 71.0 |
| $T_{DS}$ | 44.5 | 44.9 | 45.1 | 45.3 |
| $T_{IR}$ | 27.5 | 28.1 | 28.4 | 28.8 |
| $T_{TS}$ | 58.0 | 58.3 | 58.4 | 58.6 |
| L* | 87.8 | 87.9 | 87.9 | 87.9 |
| a* | −7.0 | −6.9 | −6.8 | −6.7 |
| b* | 4.6 | 4.6 | 4.6 | 4.7 |
| % Pe | 3.7 | 3.7 | 3.7 | 3.7 |
| Dw (nm) | 538.6 | 539.3 | 539.7 | 540.3 |

Table 3 shows solar control thin green glass compositions as the outer ply in triple ply laminated constructions with commercial clear glass as the two inner plies, as shown in FIG. 2. Ex 60 to 65 using examples 1 and 2 for reducing the total thickness of the laminated glass constructions while maintaining solar performance. All triple-laminated systems were simulated via Optics 6 software, developed by Lawrence Berkeley Laboratory and using 0.76 mm thick (two) commercial acoustic polymer interlayer (PVB).

TABLE 3

| | Ex60 | Ex61 | Ex62 | Ex63 | Ex64 | Ex65 |
|---|---|---|---|---|---|---|
| Outer Ply 1 (mm) | Ex 2 1.3 mm | | | Ex 1 1.2 mm | | |
| Center Ply 2 (mm) | Clear 1.1 | Clear 1.0 | Clear 0.7 | Clear 1.1 | Clear 1.0 | Clear 0.7 |
| Inner Ply 3 (mm) | Clear 1.1 | Clear 1.0 | Clear 0.7 | Clear 1.1 | Clear 1.0 | Clear 0.7 |
| Total Thickness mm | 5.02 | 4.82 | 4.22 | 4.92 | 4.72 | 4.12 |
| Solar Properties | | | | | | |
| $T_{UV}$ | 0.60 | 0.60 | 0.60 | 0.60 | 0.60 | 0.60 |
| $T_{LA}$ | 70.3 | 70.4 | 70.6 | 71.6 | 71.7 | 71.9 |
| $T_{DS}$ | 42.8 | 42.9 | 43.5 | 44.5 | 44.7 | 45.2 |
| $T_{IR}$ | 24.7 | 24.9 | 25.7 | 26.7 | 27.0 | 27.8 |
| $T_{TS}$ | 56.8 | 56.9 | 57.3 | 58.1 | 58.2 | 58.5 |
| L* | 87.7 | 87.7 | 87.8 | 88.3 | 88.3 | 88.4 |
| a* | −7.5 | −7.4 | −7.3 | −7.1 | −7.0 | −6.9 |
| b* | 5.2 | 5.2 | 5.2 | 5.0 | 5.0 | 5.1 |
| % Pe | 4.2 | 4.2 | 4.3 | 4.1 | 4.1 | 4.1 |
| Dw (nm) | 540.7 | 541.0 | 542.0 | 541.4 | 541.8 | 542.8 |

Table 4 shows solar control thin green glass compositions laminated with commercial Gorilla® Glass, as shown in FIG. 1. Ex 66 to 72 using examples 1 and 2 for reducing the total thickness of the laminated glass construction while maintaining solar performance. All laminated systems were simulated via Optics 6 software, developed by Lawrence Berkeley Laboratory and using 0.76 mm thick commercial acoustic polymer interlayer (PVB).

TABLE 4

| | Ex66 | Ex67 | Ex68 | Ex69 | Ex70 | Ex71 | Ex72 |
|---|---|---|---|---|---|---|---|
| Outer Ply 1 (mm) | TxP 2.3 | 2.60 mm, Ex 20 | 2.40 mm, Ex 16 | 2.10 mm, Ex 11 | 1.80 mm, Ex 6 | 1.60 mm, Ex 5 | 1.40 mm, Ex 3 |
| Inner Ply 2 (mm) | | | | Gorilla ® Glass 0.7 mm | | | |
| Total Thickness mm | 3.77 | 4.07 | 3.87 | 3.57 | 3.27 | 3.07 | 2.87 |

TABLE 4-continued

|  | Ex66 | Ex67 | Ex68 | Ex69 | Ex70 | Ex71 | Ex72 |
|---|---|---|---|---|---|---|---|
| Solar Properties | | | | | | | |
| $T_{UV}$ | 2.60 | 2.30 | 2.10 | 2.10 | 2.10 | 2.10 | 2.10 |
| $T_{LA}$ | 79.3 | 70.9 | 71.3 | 71.5 | 71.6 | 71.5 | 71.5 |
| $T_{DS}$ | 53.8 | 41.0 | 43.2 | 43.9 | 44.7 | 45.4 | 46.1 |
| $T_{IR}$ | 36.7 | 20.4 | 24.4 | 25.7 | 26.9 | 28.3 | 29.8 |
| $T_{TS}$ | 64.8 | 55.6 | 57.2 | 57.7 | 58.2 | 58.7 | 59.2 |
| L* | 91.9 | 88.4 | 88.3 | 88.3 | 88.3 | 88.2 | 88.2 |
| a* | −5.6 | −8.9 | −7.9 | −7.5 | −7.2 | −6.9 | −6.6 |
| b* | 2.6 | 1.8 | 3.9 | 4.3 | 3.9 | 4.2 | 4.7 |
| % Pe | 1.9 | 3.1 | 2.9 | 3.3 | 2.9 | 3.3 | 3.8 |
| Dw (nm) | 522.0 | 498.6 | 525.1 | 531.7 | 529.4 | 535.3 | 541.4 |

Notwithstanding that two laminated configurations have been described in accordance with the present invention, these are not limited as the one shown in the FIGS. 1 and 2. The order of the plies can be used inverted. This means that the outer ply can be an ion exchanged and not ion exchanged commercial clear glass, an ion exchanged and not ion exchanged borosilicate glass or an ion exchanged and not ion exchanged alkali aluminosilicate glass (Corning Gorilla® Glass) and the inner ply can be a solar control thin green glass.

From the above, the green glass compositions have been described and will be apparent to those skilled in the art that other possible advances and improvements can be performed, which may be considered within the field determined by the following claims.

We claim:

1. A glass composition for a thin green solar control glass comprising a soda-lime-silica base glass and a colorant, wherein the colorant comprises 1.55 to 2.50% of total iron expressed as $Fe_2O_3$; from 23 to 30% of $Fe^{2+}$ (Ferrous) and from 0.15 to 0.65% of FeO, expressed as $Fe_2O_3$; from about 0.05 to about 0.30% of $SO_3$; from about 0.02 to about 1.0% of $TiO_2$; from about 0.0002 to about 0.03% of $Cr_2O_3$; and from about 0.0002 to about 0.015% of CuO, the glass having an illuminant "A" light transmission ($T_{LA}$) greater of 70%, a direct solar transmittance ($T_{DS}$) of less than 51%, and a total UV light transmittance ($T_{UV}$) of less than 40% and a total solar transmittance ($T_{TS}$) of less than 63%, wherein the glass has a thickness from about 0.7 to 1.5 mm, and wherein the glass has an excitation purity of less than 3.5.

2. The solar control glass of claim 1, wherein the dominant wavelength is from 490 nm to 600 nm.

3. The solar control glass of claim 1, wherein the soda-lime-silica base glass composition comprises of 68 to 75% of $SiO_2$, 0 to 5% of $Al_2O_3$, 5 to 15% of CaO, 0 to 10% of MgO, 10 to 18% of $Na_2O$, and 0 to 5% of $K_2O$.

4. A glass sheet formed from a glass composition as claimed in claim 1 comprising a soda-lime-silica base glass and a colorant, wherein the colorant comprises 1.55 to 2.50% of total iron expressed as $Fe_2O_3$; from 23 to 30% of $Fe^{2+}$ (Ferrous) and from 0.15 to 0.65% of FeO, expressed as $Fe_2O_3$; from about 0.05 to about 0.30% of $SO_3$; from about 0.02 to about 1.0% of $TiO_2$; from about 0.0002 to about 0.03% of $Cr_2O_3$; and from about 0.002 to about 0.015% of CuO, the glass having an illuminant "A" light transmission ($T_{LA}$) greater of 70%, a direct solar transmittance ($T_{DS}$) of less than 51%, and a total UV light transmittance ($T_{UV}$) of less than 40% and a total solar transmittance ($T_{TS}$) of less than 63%, wherein the glass has a thickness from about 0.7 to 1.5 mm.

5. The glass sheet of claim 4, wherein the dominant wavelength is from 490 nm to 600 nm.

6. The glass sheet of claim 1, which is formed by a float process.

7. A symmetric-hybrid or asymmetric-hybrid laminated glass having an inner ply, an outer ply, and a polymer interlayer provided between the inner ply and outer ply, the inner ply and the outer ply and the polymer interlayer being laminated together, wherein the at least one ply includes at least one glass sheet comprising a glass composition comprising a soda-lime-silicate base glass and a colorant, wherein the colorant comprises 1.55 to 2.50% of total iron expressed as Fe2O3; from 23to 30% of $Fe^{2+}$(Ferrous) and from 0.15 to 0.65% of FeO, expressed as $Fe_2O_3$; from about 0.05 to about 0.30% of $SO_3$; from about 0.02 to about 1.0% of $TiO_2$; from about 0.0002 to about 0.03% of $Cr_2O_3$; and from about 0.0002 to about 0.015% of CuO, wherein the glass composition has an illuminant"A" light transmission (TLA) greater of 70%, a direct solar transmittance (TDS) of less than 51%, and a total UV light transmittance (Tuv) of less than 40% and a total solar transmittance (TTs) of less than 63%, and wherein the glass has a thickness from about 0.7 to 1.5 mm.

8. The laminated glass of claim 7, having an illuminant "A" light transmission (TLA) greater than 70%, a direct solar transmittance ($T_{DS}$) of less than 50%, a total UV light transmittance ($T_{UV}$) of less than 5% and a total solar transmittance ($T_{TS}$) of less than 60% for at least a total thickness of the laminated glass from about 2.3 to 5.0 mm.

9. The laminated glass of claim 7, wherein the inner ply has a thickness ranging from about 0.5 mm to 2.0, and the outer ply has a thickness ranging from about 1.0 mm to about 2.6 mm.

10. The laminated glass of claim 7, wherein the inner ply comprises a glass from of an ion exchanged and not ion exchanged alkali aluminosilicate glass (Gorilla® Glass).

11. The laminated glass of claim 7, wherein the inner ply comprises a glass from of an ion exchanged and not ion exchanged borosilicate glass.

12. The laminated glass structure of claim 7, wherein the inner ply comprises a glass from of an ion exchanged and not ion exchanged soda lime silicate glass.

13. The laminated glass of claim 7, comprising:
an inner ply of a commercial clear glass;
a polymer interlayer over the inner ply; and
an outer ply comprising a glass composition formed from the soda-lime-silicate base glass and the colorant of claim 9 and having the property set recited therein, wherein the laminated glass has a thickness from about 2.3 to 5.0 mm.

14. The laminated glass of claim 13, wherein the outer ply has a thickness from about mm to 3.0 mm.

15. The laminated glass of claim 13, wherein the inner ply has thickness ranging from about 0.7 mm to 1.0 mm.

16. The laminated glass of claim 7, comprising:
an inner ply of a commercial clear glass;
a first polymer interlayer over inner ply;
a center ply of a commercial clear glass;
a second polymer interlayer over the center ply; and
an outer ply comprising a glass composition formed from the soda-lime-silicate base glass and the colorant of claim 9 and having the property set recited therein,
wherein the laminated glass has a thickness from about 3.5 to 5.0 mm.

17. The laminated glass of claim 16, wherein the inner ply and the center ply have a thickness ranging from about 0.5 mm to 1.1 mm; and the outer ply has a thickness from about 0.7 to 1.5 mm.

18. The laminated glass of claim 7, comprising:
an inner ply of Gorilla® Glass;
a first polymer interlayer over the inner ply;
a center ply of Gorilla® Glass;
a second polymer interlayer over the center ply; and
an outer ply comprising a glass composition formed from the soda-lime-silicate base glass and the colorant of claim 9 and having the property set recited therein,
wherein the laminated glass has a thickness from about 3.5 to 5.0 mm.

19. The laminated glass of claim 18, wherein the inner ply and center ply have a thickness ranging from about 0.5 mm to 1.1 mm; and the outer ply has a thickness from about 0.7 to 1.5 mm.

20. The laminated glass of claim 7, wherein the outer ply can be an ion exchanged and not ion exchanged commercial clear glass, an ion exchanged and not ion exchanged borosilicate glass or an ion exchanged and not ion exchanged alkali aluminosilicate glass (Corning Gorilla® Glass) and the inner ply is manufactured of the green glass composition.

* * * * *

UNITED STATES PATENT AND TRADEMARK OFFICE
CERTIFICATE OF CORRECTION

PATENT NO. : 12,151,970 B2  
APPLICATION NO. : 16/212338  
DATED : November 26, 2024  
INVENTOR(S) : José Guadalupe Cid-Aguilar et al.

Page 1 of 1

It is certified that error appears in the above-identified patent and that said Letters Patent is hereby corrected as shown below:

In the Claims

Column 19, Line 61, Claim 4, delete "0.002" and insert -- 0.0002 --

Column 20, Line 29, Claim 7, delete "Fe2O3; from 23to" and insert -- $Fe_2O_3$; from 23 to --

Column 20, Line 30, Claim 7, delete "Fe2O3;" and insert -- $Fe_2O_3$; --

Column 20, Line 34, Claim 7, delete "illuminant"A"" and insert -- illuminant "A" --

Column 20, Line 35, Claim 7, delete "(TLA)" and insert -- ($T_{LA}$) --

Column 20, Line 35, Claim 7, delete "(TDS)" and insert -- ($T_{DS}$) --

Column 20, Line 36, Claim 7, delete "(Tuv)" and insert -- ($T_{UV}$) --

Column 20, Line 37, Claim 7, delete "(TTs)" and insert -- ($T_{TS}$) --

Column 20, Line 42, Claim 8, delete "(TLA)" and insert -- ($T_{LA}$) --

Column 20, Line 57, Claim 12, delete "structure"

Signed and Sealed this  
Twenty-seventh Day of May, 2025

Coke Morgan Stewart  
*Acting Director of the United States Patent and Trademark Office*